UNITED STATES PATENT OFFICE.

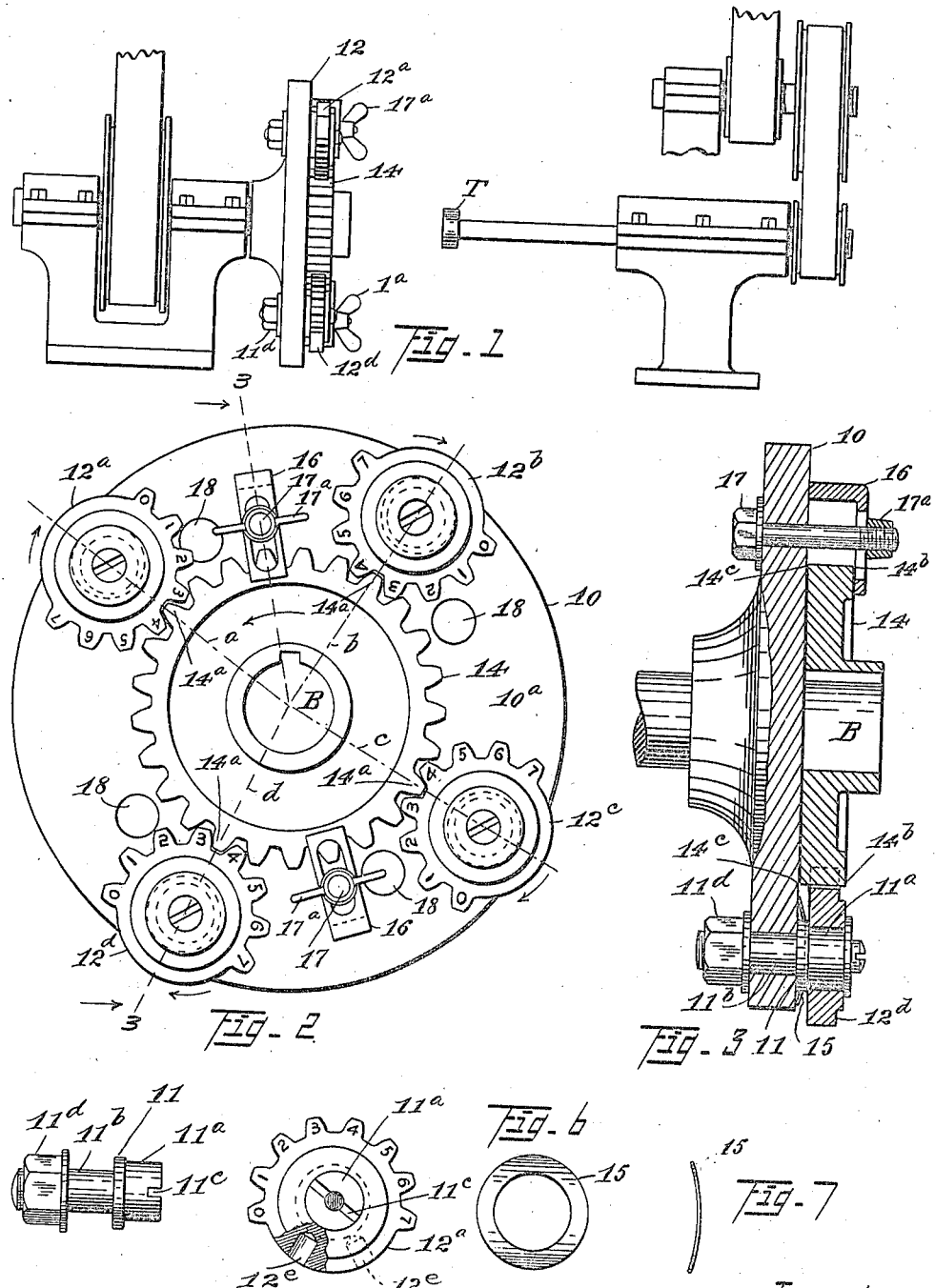

JAMES P. JOHNSON, OF CLEVELAND, OHIO.

GEAR-GRINDING CHUCK.

1,219,740.  Specification of Letters Patent.  Patented Mar. 20, 1917.

Application filed December 20, 1916. Serial No. 137,989.

*To all whom it may concern:*

Be it known that I, JAMES P. JOHNSON, a citizen of the United States, residing at Cleveland, in the county of Cuyahoga and State of Ohio, have invented a certain new and useful Improvement in Gear-Grinding Chucks, of which the following is a specification.

This invention relates to the construction of a chuck or mechanism for centering and firmly holding a gear to be operated on, during the operation of grinding the bore of said gear. Gears are ground on a grinding machine or lathe provided for the purpose, the gear to be ground being centered and held firmly on the mandrel of the lathe so that it will revolve therewith. In the making of gears for high grade work where accuracy of mesh and other factors of perfection are required, it is imperative that the gear be held firmly on the face of the mandrel and centered with absolute precision. The objects of the present invention are the provision of a chuck embodying means for realizing or performing the above mentioned functions, that is simple and economical in construction, that is readily adjustable to meet the requirements in the grinding of gears of different diameters, that is easy to operate and that is absolutely reliable in the performance of the required functions. With these objects in view the invention consists in the novel arrangement on the face of the mandrel head, of a series of geared members that co-act to grip the gear and firmly hold same on the face of the mandrel with the center of the gear invariably in the axial line of rotation of said mandrel and the grinding tool. The novel construction, arrangement and combination of the elements is clearly shown in the accompanying drawings and fully explained in the following specification, similar characters of reference being employed to designate similar parts.

In the aforesaid drawings Figure 1 is an outline representation of portions of a gear grinding machine embodying the improvement. Fig. 2 is a view of the face of the mandrel head showing a gear positioned thereon, and the gripping attachments for holding same. Fig. 3 is a section on line 3—3 of Fig. 2. Fig. 4 is a view of one of the spindles detached. Fig. 5 is a view of one of the segmental gripping gears showing its position on the spindle and a portion in section. Fig. 6 illustrates a friction washer used in the construction, and Fig. 7 is an edge view of said washer partially in section.

In a preferred embodiment of the invention, the mandrel head comprises a disk 10 which is common to machines of this character. This disk may be of sufficient face area to accommodate gears of various diameters, and is provided with a series of spindles 11, on which are mounted segmental gears $12^a$, $12^b$, $12^c$, and $12^d$. The formation and particular location of the segmental gears, relative to the gear to be ground are salient factors of the invention. The spindles 11 are located in the head 10 with their centers equidistant from the center or axis of rotation of said head, this distance being governed by the diameter of the gear to be ground, but in all cases it is equal to the combined pitch radii of said gear and the corresponding grip gear. Another important factor in the construction is the spacing of the spindles relative to the teeth of the gear to be operated upon. If the number of teeth of the gear is a multiple of two, the circumferential distance between the centers of the spindles is equal, but if the gear 14 has an odd number of teeth, as illustrated in Fig. 2, the circumferential distance between centers of spindles 11 must vary, as it is imperative that said spindles be so positioned that when the gear is placed on the face of the member 10 and radial lines $a$, $b$, $c$, and $d$ are drawn from the center of the gear to the spindle centers they will each pass through the middle of a tooth as shown in Fig. 2 where the gear 14 has twenty-five teeth, therefore the circumferential distance between members $12^a$ and $12^b$ is equal to the like distance between $12^b$ and $12^c$, and between $12^c$ and $12^d$, but the distance between $12^d$ and $12^a$ must necessarily be greater, owing to the extra tooth. This condition must always prevail in the arrangement of the elements for operating on gears having an odd number of teeth. If the number of teeth of the gear to be ground is a multiple of two and four gripping members are employed the spindles may be equally spaced 90° apart, of if for the same operation three gripping members are used the spindles are placed 120° apart.

Another important feature of the present invention is the formation of the teeth of the segmental gripping members which will now be described. The teeth of the segmental gears 12ᵃ, 12ᵇ, 12ᶜ, and 12ᵈ vary in size, slightly decreasing from 0 to 7, in practice a few thousandths decrease being all that is necessary, but while the teeth in each member vary in size, it is imperative that the said members be exact counterparts, that the 0 teeth are identical and that the same exact likeness prevails throughout all teeth corresponding in number from 0 to 7 inclusive. To insure this factor of precision, in making the device the segmental teeth members for each type of gear all are turned at the same time and their teeth cut in the same operation.

The parts 11ᵃ of the spindles are turned eccentric to the studs 11ᵇ, and the segmental grip members are mounted on the eccentric members 11ᵃ. In assembling the device the spindle members 11 are adjusted so that the eccentric parts 11ᵃ are in corresponding positions on the face 10ᵃ relative to the center of said face, a slot 11ᶜ being provided in the member for facilitating this adjustment. When properly adjusted the spindles are locked in position by nuts 11ᵈ. The grip members are mounted on the eccentric spindles with a spring washer 15 interposed between said grip members and the face 10ᵃ for the purpose hereinafter set forth.

In operation the gear 14 is placed flat on the face 10ᵃ with certain teeth in mesh with corresponding teeth in the segmental gears 12ᵃ, 12ᵇ, 12ᶜ and 12ᵈ, as shown in Fig. 2, where the gear teeth 14ᵃ are in mesh with the several grip members between the teeth 3 and 4. After gear 14 is so located the grip members are simultaneously rotated on their respective spindles in the direction of arrows, which results in the rotation of the gear 14 in the opposite direction, centering and firmly holding said gear on the face 10ᵃ. This is accomplished in the following described manner. The grip members are provided with one or more sockets 12ᵉ adapted for the insertion of an instrument which performs the function of a lever whereby the member may be rotated. It will readily be seen that the action of rotation of one of the segmental members causes the other like members to simultaneously act in the same manner through the medium of the gear 14, the uniform eccentricity of the spindles 11ᵃ causing an equal thrust on the gear. The action of the grinding tool T during its operation in the bore B has a tendency to tighten the gear, as the direction of rotation of said tool is the same as the tightening rotation imparted to the gear by the segmental grip members.

When the grinding operation on the gear has been completed the gear is released by a reverse movement of the segmental grip members.

The spring washers 15 bearing on the face 14ᵃ and on the segmental grip members retain said grip members in the desired adjustment for the insertion of the gear preparatory to the initial operation. While the uniform gripping action of the members 12ᵃ, 12ᵇ, 12ᶜ, and 12ᵈ, on the gear 14, retains said gear in the required position, precautionary means are provided by clamp members 16 which overlap the periphery of the gear, said members being provided with set bolts 17 and nuts 17ᵃ.

In the embodiment of the improvement as illustrated, four gripping members are employed, but the same principles of operation will prevail with the required satisfactory result by the use of three or more gripping members arranged in like manner relative to the teeth of the gear and coöperating with said gear in the manner as set forth.

Holes 18 are provided to accommodate the gripping mechanism for operating on a gear of smaller diameter than the gear 14. The head 10 may be provided with several different combinations of such apertures to accommodate a variety of gears, but to avoid perplexity in the drawings only two combinations are shown, the one in operative condition and another as indicated by the holes 18.

While it is not a necessary adjunct to the accurate operation of the device and is therefore not embodied in the construction as shown, it is however apparent that the several grip members may be linked together by some suitable means. This would more or less complicate the mechanism without enhancing the efficiency of the device and is merely mentioned as an anticipation.

It occasionally happens that the edges or corners 14ᵇ or 14ᶜ of the gear teeth are chipped or imperfect, and as a provision against this occurrence, it is preferable to make the gripping members thinner, or of less transverse tooth face dimension than the gear to be operated on, as shown in Fig. 3.

The embodiment of the invention as illustrated and described is practical and reliable, but there may be changes made in the design, number and arrangement of parts, or other minor details, without departing from the general principles or imperative functions set forth.

What I claim and desire to secure by Letters Patent is:

1. A gear grinding chuck comprising a flat mandrel face adapted to receive a gear to be ground, a series of geared gripping members mounted on eccentric spindles on said flat face, said spindles being located equidistant from the axis of rotation of the mandrel head, the teeth of the gripping members being arranged to engage the teeth of the gear to be ground.

2. A gear grinding chuck comprising a flat plate attached to the mandrel of the gear grinding lathe as a seat for the gear to be ground, a series of eccentric spindles located on said face plate equidistant from the axis of rotation of said plate, segmental gears mounted on said eccentric spindles and arranged to oscillate eccentrically thereon with their teeth in engagement with the teeth of the gear to be ground.

3. In mechanism for centering and retaining a gear in a gear grinding lathe, in combination with the mandrel of said lathe, a plain flat plate adapted to revolve with said mandrel and carry the gear to be ground, a series of eccentrically mounted gears arranged on said plate so that they will engage the teeth of the gear to be ground and bind on said gear when rotated in one direction and in the opposite direction release said gear.

4. A gear grinding chuck comprising a flat mandrel face adapted to receive a gear to be ground, a series of geared gripping members mounted on eccentric spindles on said flat face, said spindles being located equidistant from the axis of rotation of the mandrel, the teeth of the gripping members being arranged to engage the teeth of the gear to be ground, and means for adjusting the eccentricity of the spindles.

5. A gear grinding chuck comprising a flat face plate attached to the mandrel of the gear grinding lathe as a seat for the gear to be ground, a series of eccentric spindles located on said face plate equidistant from the axis of rotation of said plate, geared gripping members mounted on said eccentric spindles and arranged to oscillate eccentrically thereon with their teeth in engagement with the teeth of the gear to be ground, means for adjusting the eccentricity of the spindles, and friction washers interposed between the gripping members and the face plate.

6. In mechanism of the character and for the purpose set forth, the combination of a mandrel provided with a face plate adapted to rotate with said mandrel and carry a gear to be ground, a series of eccentrically mounted gripping gears arranged on said plate equidistant from the axis of rotation of said plate so that they will engage the teeth of the gear to be ground and bind on said gear when rotated in one direction and in the opposite direction release said gear, and means for attaching various combinations of eccentrically mounted gripping gears to said plate to accommodate gears of different diameters, to be ground.

7. In mechanism of the character and for the purpose set forth, the combination of a mandrel provided with a face plate adapted to rotate with said mandrel and carry a gear to be ground, a series of eccentrically mounted gripping gears arranged on said plate equidistant from the axis of rotation of said plate so that they will engage the teeth of the gear to be ground and bind on said gear when rotated in one direction and in the opposite direction release said gear, means for attaching various combinations of eccentrically mounted gripping gears to said plate to accommodate gears of different diameters, to be ground, and means for adjusting the eccentricity of the gripping gears.

8. In mechanism of the character and for the purpose set forth, the combination of a mandrel provided with a face plate adapted to rotate with said mandrel and carry a gear to be ground, a series of eccentrically mounted gripping gears arranged on said plate equidistant from the axis of rotation of said plate so that they will engage the teeth of the gear to be ground and bind on said gear when rotated in one direction and in the opposite direction release said gear, means for attaching various combinations of eccentrically mounted gripping gears to said plate to accommodate gears of different diameters, to be ground, means for adjusting the eccentricity of the gripping gears, and friction washers interposed between the gripping gears and the face plate.

9. A gear grinding chuck comprising a flat plate attached to the mandrel of the gear grinding lathe as a seat for the gear to be ground, a series of eccentric spindles located on said face plate equidistant from the axis of rotation of said plate, segmental gears mounted on said eccentric spindles and arranged to oscillate eccentrically thereon with their teeth in engagement with the teeth of the gear to be operated on, and adjustable clamps that are adapted to overlap the periphery of the gear and clamp said gear to the face plate.

10. A gear grinding chuck comprising a flat mandrel face adapted to receive a gear to be ground, a series of geared gripping members mounted on eccentric spindles on said flat face, said spindles being located equidistant from the axis of rotation of the mandrel, the teeth of the gripping members being arranged to engage the teeth of the gear to be ground, and means for simultaneously oscillating said gripping members on the eccentric spindles.

11. A gear grinding chuck comprising a flat face plate attached to the mandrel of the gear grinding lathe as a seat for the gear to be ground, a series of eccentric spindles located on said face plate equidistant from the axis of rotation of said plate, geared gripping members mounted on said eccentric spindles and arranged to oscillate eccentrically thereon with their teeth in engagement with the teeth of the gear to be ground, means for adjusting the eccentricity of the spindles, friction washers interposed between the gripping members and the face plate, and means for simultaneously oscillating said geared gripping members on the eccentric spindles.

12. A gripping member for a gear chuck, comprising an eccentric gear having irregular teeth adapted to engage the teeth of a gear to be ground.

13. In a gear chuck the combination of a series of eccentric gears each having irregular teeth, said gears being counterparts of each other and adapted to uniformly engage the teeth of a gear to be ground.

14. In a gear chuck, the combination of a series of eccentric gears each having irregular teeth, said gears being counterparts of each other and adapted to uniformly engage the teeth of a gear to be ground, and means for oscillating said gears.

JAMES P. JOHNSON.